(12) United States Patent
Toko et al.

(10) Patent No.: US 11,009,734 B2
(45) Date of Patent: May 18, 2021

(54) CONTROL DEVICE FOR VEHICULAR LAMP, CONTROL METHOD FOR VEHICULAR LAMP, VEHICULAR LAMP SYSTEM

(71) Applicant: Stanley Electric Co., Ltd., Tokyo (JP)

(72) Inventors: Yasuo Toko, Tokyo (JP); Yoshihisa Iwamoto, Tokyo (JP); Takuya Kitazono, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/547,771

(22) Filed: Aug. 22, 2019

(65) Prior Publication Data
US 2020/0063940 A1 Feb. 27, 2020

(30) Foreign Application Priority Data
Aug. 22, 2018 (JP) .............................. JP2018-155740

(51) Int. Cl.
*G02F 1/1333* (2006.01)
*F21S 41/64* (2018.01)

(52) U.S. Cl.
CPC ...... *G02F 1/133382* (2013.01); *F21S 41/645* (2018.01)

(58) Field of Classification Search
CPC ... F21S 41/645; F21S 45/60; G02F 1/133382; G02F 1/1313
See application file for complete search history.

(56) References Cited

U.S. PATENT DOCUMENTS

| | | | |
|---|---|---|---|
| 6,211,852 B1 * | 4/2001 | Oono | G09G 3/18 345/101 |
| 2003/0231157 A1 * | 12/2003 | Sugino | G02F 1/133382 345/101 |
| 2006/0164230 A1 | 7/2006 | DeWind et al. | |
| 2013/0335459 A1 * | 12/2013 | Tokoo | G02F 1/133526 345/690 |
| 2015/0185545 A1 * | 7/2015 | Tetsuka | B62K 11/04 180/90 |
| 2016/0161742 A1 * | 6/2016 | Yonemoto | H05B 47/105 349/11 |
| 2017/0144591 A1 * | 5/2017 | Yatsu | F21S 41/125 |

FOREIGN PATENT DOCUMENTS

| | | |
|---|---|---|
| DE | 10 2008 008 664 A1 | 9/2009 |
| DE | 11 2014 003 540 T5 | 5/2016 |
| EP | 1 372 022 A2 | 12/2003 |
| JP | 2005-183327 A | 7/2005 |
| KR | 10-2006-0017205 A | 2/2006 |
| WO | 2014/002630 A1 | 1/2014 |

OTHER PUBLICATIONS

The extended European Search Report for the related European Patent Application No. 19190553.8 dated Jan. 8, 2020.

\* cited by examiner

*Primary Examiner* — Jia X Pan
(74) *Attorney, Agent, or Firm* — Kenealy Vaidya LLP

(57) ABSTRACT

To reliably perform light irradiation in a vehicular lamp system using a liquid crystal element even in a cryogenic environment. A control device for a vehicular lamp comprising a light source and a liquid crystal element where the liquid crystal element is set to a light-shielded state and the light source is set to a light-on state to heat the liquid crystal element by the light emitted from the light source when the temperature of the liquid crystal element is estimated to be lower than a predetermined value.

11 Claims, 5 Drawing Sheets

CONTROL DEVICE FOR VEHICULAR LAMP, CONTROL METHOD FOR VEHICULAR LAMP, VEHICULAR LAMP SYSTEM

BACKGROUND OF THE INVENTION

Field of the Invention

The present invention relates to a technique for controlling a vehicular lamp system that performs light distribution control using a liquid crystal element.

Description of the Background Art

Conventionally, a technique to control light distribution in which the shape and illuminance, etc. of light irradiated to the front of its own vehicle are controlled by using liquid crystal elements is known. (For example, refer to Japanese Unexamined Patent Application Publication No. 2005-183327). In such light distribution control, a light distribution pattern is formed by causing light emitted from a light source to be incident on liquid crystal elements in order to control the transmission state of the light. Then, by projecting the light distribution pattern toward the front of the own vehicle, light irradiation state in the so to speak high beam irradiation range is controlled. For example, other vehicles existing in front of the own vehicle are detected and light distribution is realized such that high beam is dimmed or shielded in the region where the other vehicles are present, and high beam is emitted in the other region.

Here, the environment in which the own vehicle is used varies, and sometimes the vehicle may be placed in a cryogenic environment (for example, minus several tens of degrees Celsius). Under such cryogenic environment, generally, the responsiveness of the liquid crystal elements decreases significantly.

Thus, when normally black type liquid crystal elements are used for example, it may become difficult to irradiate high beam immediately after starting the vehicle power unit. For example, when the driver attempts to flash high-beams (briefly switch on high-beams), the liquid crystal elements may not respond in time, and inconvenience where high beam is hardly irradiated could occur.

In a specific aspect, in a vehicular lamp system using a liquid crystal element, it is an object of the present invention to provide a technique capable of reliably performing light irradiation even in a cryogenic environment.

SUMMARY OF THE INVENTION

[1] A control device for a vehicular lamp according to one aspect of the present invention is (a) a device adapted to control the operation of a vehicular lamp configured to include a light source and a liquid crystal element where (b) the liquid crystal element is set to a light-shielded state and the light source is set to a light-on state when the temperature of the liquid crystal element is estimated to be lower than a predetermined value, thereby heating the liquid crystal element by the light emitted from the light source.

[2] A control device for a vehicular lamp according to one aspect of the present invention is (a) a device adapted to control the operation of a vehicular lamp configured to include a light source and a liquid crystal element which forms an image using light emitted from the light source including: (b) a heating control part adapted to control the heating of the liquid crystal element, (c) a liquid crystal operation control part adapted to control the operation of the liquid crystal element, (d) a light source operation control part adapted to control the operation of the light source (e) where the heating control part instructs the liquid crystal operation control part to set the liquid crystal element to a light-shielded state and instructs the liquid crystal operation control part to set the light source to a light-on state when the temperature of the liquid crystal element is estimated to be lower than a predetermined value.

[3] A control method for a vehicular lamp according to one aspect of the present invention is (a) a method adapted to control the operation of a vehicular lamp configured to include a light source and a liquid crystal element where (b) the liquid crystal element is set to a light-shielded state and the light source is set to a light-on state when the temperature of the liquid crystal element is estimated to be lower than a predetermined value, thereby heating the liquid crystal element by the light emitted from the light source.

[4] A vehicular lamp system according to one aspect of the present invention is a vehicular lamp system including the above-described control device and a vehicular lamp controlled by the control device.

According to the above configurations, in a vehicular lamp system using a liquid crystal element, it is possible to reliably perform light irradiation even in a cryogenic environment.

DESCRIPTION OF THE PREFERRED EMBODIMENTS

Figure 1:
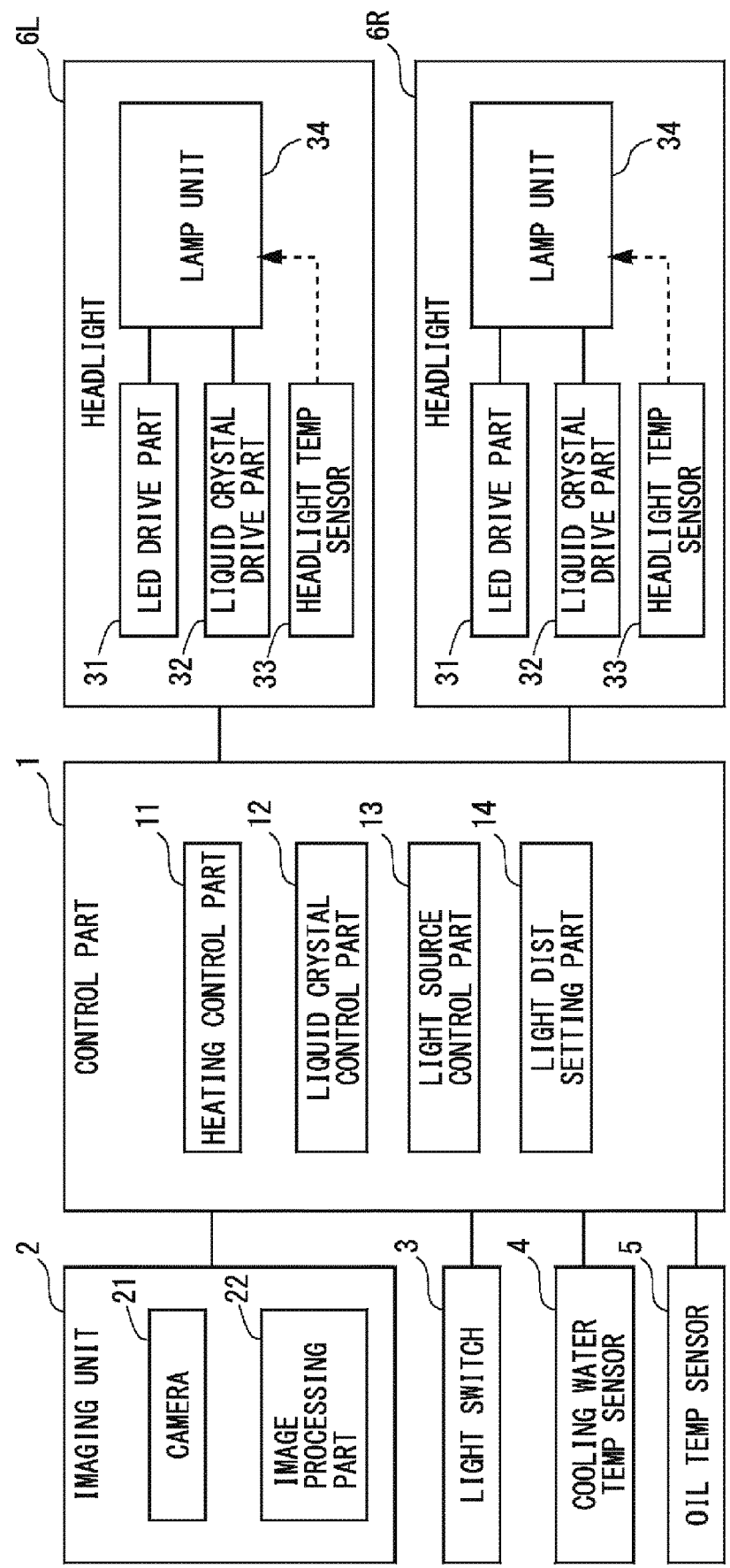
FIG. 1 is a diagram showing an overall configuration of a vehicular lamp system according to one embodiment.

FIG. 1 is a diagram showing an overall configuration of a vehicular lamp system according to one embodiment. The illustrated vehicular lamp system is capable of performing selective light irradiation within the high beam irradiation range toward the front of the vehicle, and is configured to include a control part 1, an imaging unit 2, a light switch 3, a cooling water temperature sensor 4 (abbreviated as COOLING WATER TEMP SENSOR in FIG. 1), an oil temperature sensor 5 (abbreviated as OIL TEMP SENSOR in FIG. 1), and a pair of headlights 6L and 6R. Here, the configuration for irradiating a low beam (dipped beam) is omitted.

The control part 1 controls the whole operation of the vehicular lamp system. The control part 1 carries out a predetermined operation program in a computer system comprising a CPU, ROM, RAM, etc, for example. As functional blocks realized by executing the operation program, the control part 1 is configured to include a heating control part 11 which is adapted to control heating of the liquid crystal element included in each headlight 6L and 6R, a liquid crystal control part 12 which is adapted to control the operation of the liquid crystal element, a light source control part 13 which is adapted to control the operation of the light source included in each headlight 6L and 6R, and a light distribution setting part 14 (abbreviated as LIGHT DIST SETTING PART in FIG. 1) which is adapted to set a light distribution pattern when selective light irradiation is performed within the high beam irradiation range.

The imaging unit 2 is configured to include a camera 21 and an image processing part 22. The camera 21 is installed at a predetermined position of the vehicle (for example, upper portion inside the windshield), and captures the space in front of the vehicle to generate an image. The image processing part 22 is adapted to perform a predetermined image recognition process on the image generated by the camera 21 to detect a preceding vehicle, an oncoming vehicle, a pedestrian, a traffic lane, etc. existing in front of the vehicle. A light distribution pattern is established by the light distribution setting part 14 described above in accordance with the detected preceding vehicle, oncoming vehicle, etc., and the operation of a liquid crystal drive part 32 is controlled by the liquid crystal control part 12 so as to form an image according to the light distribution pattern. Here, note that some or all of the functions of the image processing part 22 may be realized in the control part 1.

The light switch 3 is provided near the driver's seat of the vehicle, and is used by the driver to switch on or switch off the headlights and/or to briefly switch on high-beam (flash high-beam).

The cooling water temperature sensor 4 detects the cooling water temperature of the vehicle. The oil temperature sensor 5 detects the engine oil temperature of the vehicle. Here, since each of these sensors is usually already provided in the vehicle, they can be utilized.

The pair of headlights 6L and 6R are installed respectively on the left and right of the front of the vehicle. Each of the headlights 6L and 6R is configured to include an LED drive part 31, a liquid crystal drive part 32, a headlight temperature sensor 33 (abbreviated as HEADLIGHT TEMP SENSOR in FIG. 1), and a lamp unit 34.

The LED drive part 31 drives the LED included in the light source provided in the lamp unit 34 based on the control signal provided from the light source control part 13. The liquid crystal drive part 32 drives the liquid crystal element provided in the lamp unit 34 based on the control signal provided from the liquid crystal control part 12.

Here, in the present embodiment, a "liquid crystal operation control part" is configured to include the liquid crystal control part 12 of the control part 1 and the plurality of liquid crystal drive parts 32 of the respective headlights 6L and 6R, and a "light source operation control part" is configured to include the light source control part 13 of the control part 1 and the plurality of LED drive parts 31 of the respective headlights 6L and 6R.

Each headlight temperature sensor 33 is installed at an appropriate position within the housing of the respective headlights 6L and 6R, and the sensor detects the temperature inside the housing of the respective headlights 6L and 6, more preferably, the sensor detects the temperature near the lamp unit 34.

The lamp unit 34 is driven by each of the LED drive part 31 and the liquid crystal drive part 32 to emit light in front of the vehicle according to various light distribution patterns.

Figure 2:
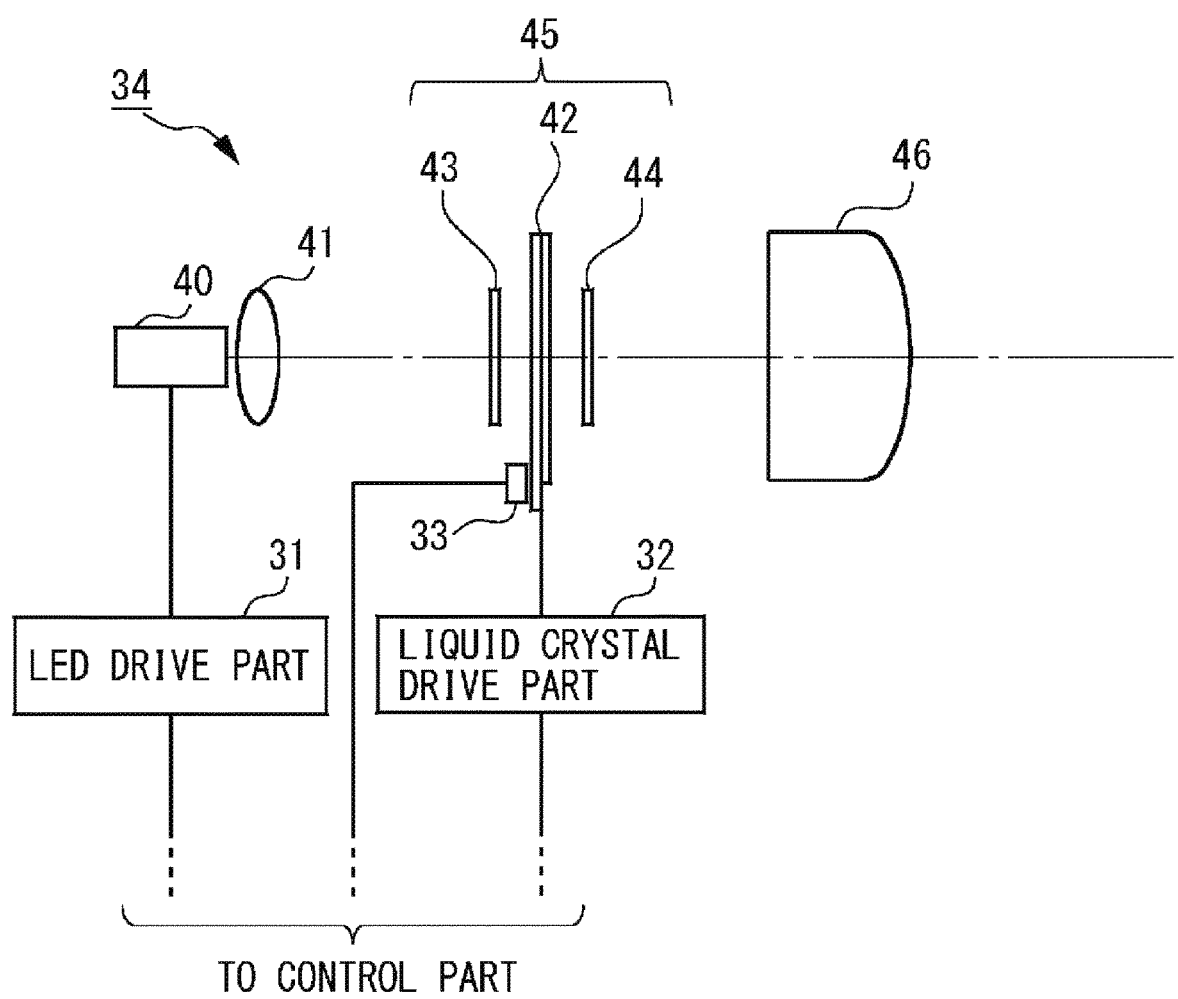
FIG. 2 is a diagram showing a configuration example of a lamp unit.

FIG. 2 is a diagram showing a configuration example of a lamp unit. The lamp unit 34 in the illustrated example is configured to include a light source 40, a condensing lens 41, a liquid crystal panel 42, a pair of polarizers 43 and 44, and a projection lens 46. Here, the liquid crystal element 45 is configured to include the liquid crystal panel 42 and the pair of polarizers 43 and 44.

The light source 40 is configured to include LEDs (semiconductor light emitting elements) and is driven by the LED drive part 31 to emit light. The condensing lens 41 condenses the light emitted from the light source 40 and causes the light to enter the liquid crystal element 45.

The liquid crystal element 45 is driven by the liquid crystal drive part 32 to form an image corresponding to various light distribution patterns by modulating incident light. In this liquid crystal element 45, the pair of polarizers 43 and 44 are disposed to face each other with the liquid crystal panel 42 interposed therebetween. There is no close contact between the pair of polarizers 43 and 44 and the liquid crystal panel 42, and a predetermined gap is provided therebetween. In the present embodiment, the pair of polarizers 43 and 44 are arranged such that their absorption axes are substantially orthogonal. As each of the polarizers 43 and 44, a wire grid polarizer is preferably used, for example.

Further, as the liquid crystal panel 42, a vertical alignment type liquid crystal panel is used. That is, the liquid crystal element 45 is configured as a normally black type liquid crystal element in which the light transmittance is extremely low (substantially a light-shielded state) when no voltage is applied.

The projection lens 46 projects the image of the light formed by the liquid crystal element 45 toward front of the vehicle. Thereby, a light distribution pattern corresponding to the image of the light is formed in front of the vehicle.

Here, as shown in FIG. 2, the headlight temperature sensor 33 is preferably installed in the vicinity of the liquid crystal panel 42 (for example, on the substrate surface). Thereby, the temperature of the liquid crystal panel 42 can be detected more reliably.

Figure 3:
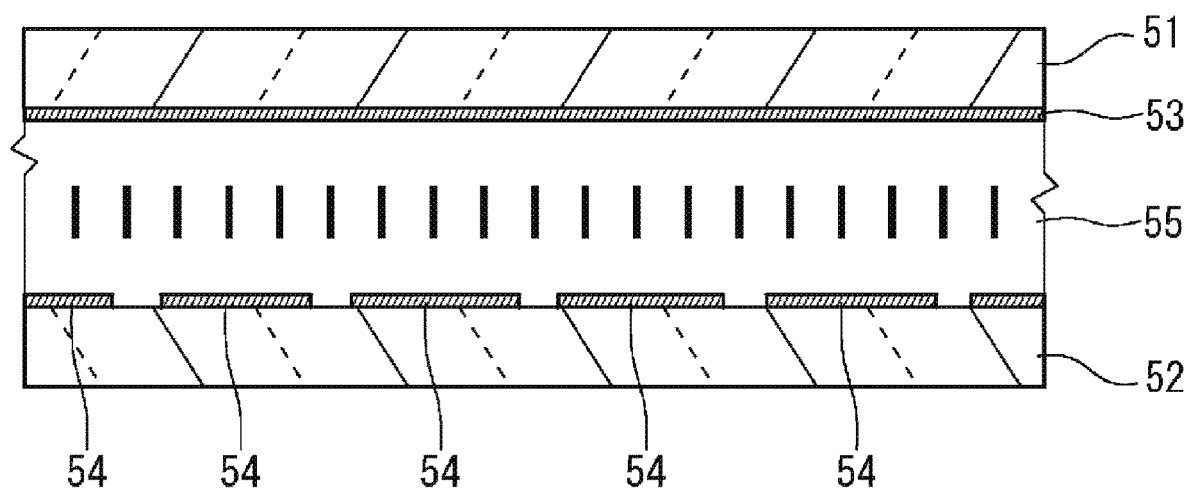
FIG. 3 is a schematic cross-sectional view showing a configuration example of a liquid crystal panel.

FIG. 3 is a schematic cross-sectional view showing a configuration example of a liquid crystal panel. The illustrated liquid crystal panel 42 is configured to include a first substrate 51, a second substrate 52, a first electrode 53, a second electrode 54, and a liquid crystal layer 55.

The first substrate 51 and the second substrate 52 are transparent substrates such as a glass substrate, a plastic substrate, etc., respectively. As illustrated, the first substrate 51 and the second substrate 52 are bonded together with a predetermined gap (for example, about 4 μm).

The first electrode 53 is provided on one surface side of the first substrate 51. Similarly, the second electrode 54 is provided on one surface side of the second substrate 52. The first electrode 53 and the second electrode 54 are each formed by appropriately patterning a transparent conductive film such as indium tin oxide (ITO). Each overlapping region of the first electrode 53 and the second electrode 54 becomes a pixel region (a light modulation region), and modulation can be applied individually to light incident to each of the pixel regions.

Here, although not shown, an alignment film is provided on one surface of each of the first substrate 51 and the second substrate 52 so as to cover each electrode.

The liquid crystal layer 55 is provided between the first substrate 51 and the second substrate 52. In the present embodiment, the liquid crystal layer 55 is configured to use a liquid crystal material having a negative dielectric anisotropy $\Delta\varepsilon$. The refractive index anisotropy $\Delta n$ of the liquid crystal material is about 0.09, for example. The plurality of thick straight lines illustrated in the liquid crystal layer 55 area schematically indicates the alignment direction of liquid crystal molecules in the liquid crystal layer 55. In the liquid crystal layer 55 of this embodiment, the alignment direction of the liquid crystal molecules when no voltage is applied is vertically aligned, and is substantially perpendicular (for example, 89.9°, etc.) to the substrate surfaces of the first substrate 51 and the second substrate 52. Here, the operation mode of the liquid crystal layer 55 is not limited to the exemplified vertical alignment mode, and various operation modes such as TN mode or IPS mode can be used.

Figure 4:
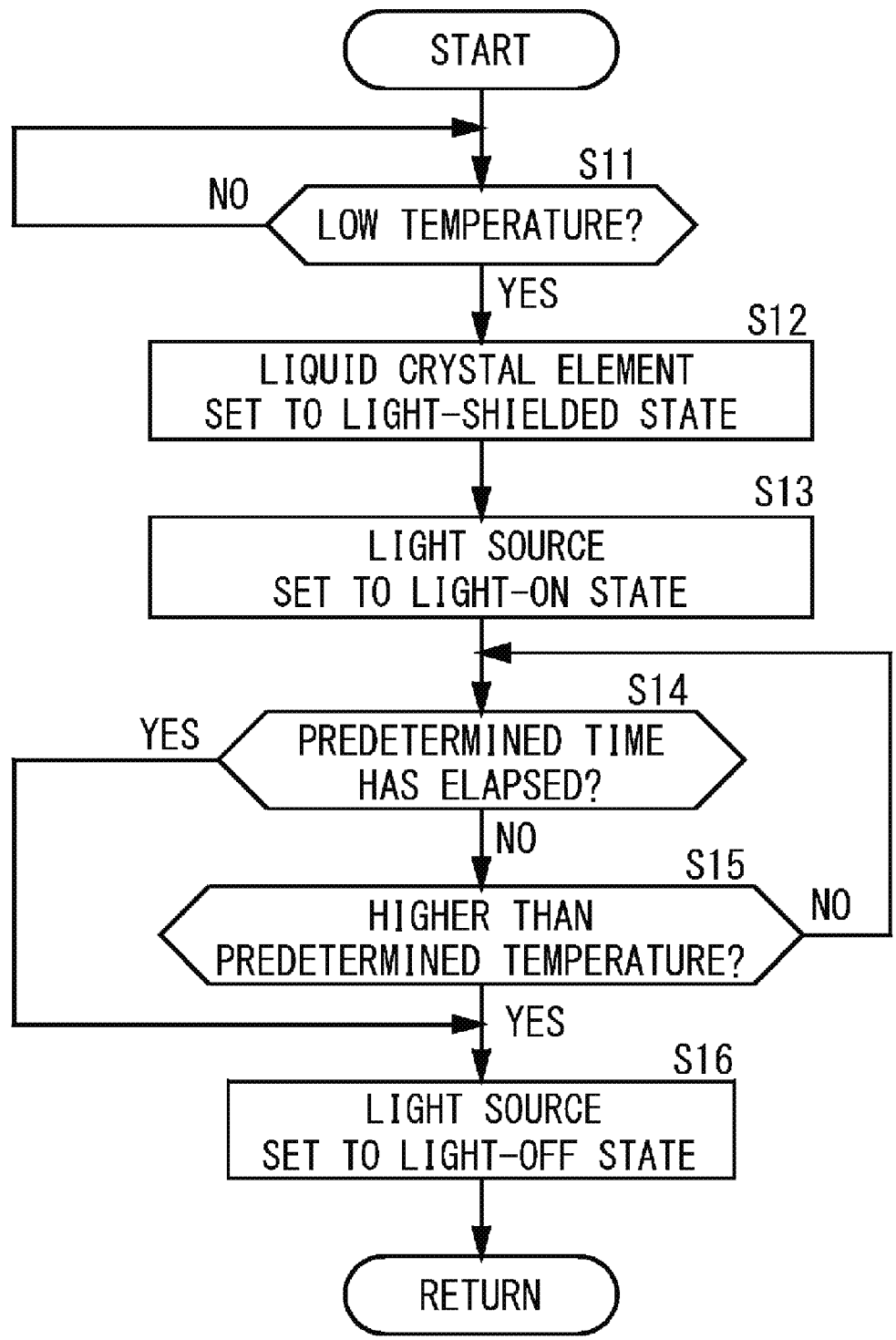
FIG. 4 is a flowchart showing an operation procedure of the control part.

FIG. 4 is a flowchart showing an operation procedure of the control part. Here, an operation procedure is shown where the light emitted from the light source 40 of the lamp unit 34 is used to heat the liquid crystal element 45 to rapidly increase its temperature when the environmental temperature is extremely low after the start of the vehicle power unit. Here, the processing sequence may be changed so long as no inconsistency occurs in the process, and is not limited to the illustrated processing sequence. Further, the start of the vehicle power unit is detected based on the operating state of the ignition switch, etc., for example.

The heating control part 11 of the control part 1 determines whether or not the liquid crystal element 45 is estimated to be in a low temperature state meeting a certain standard (STEP S11). In the present embodiment, based on the temperatures detected by the plurality of headlight temperature sensors 33 of the respective headlights 6L and 6R, for example, when the temperature is −20° C. or lower, it is determined to be in a estimated low temperature state. Here, since two temperatures are detected by two of the headlight temperature sensors 33, the determination may be performed using any lower temperature, or the determination may be performed using an average value of the two temperatures, for example.

Furthermore, whether or not the liquid crystal element 45 is estimated to be in a low temperature state meeting a certain standard may be determined based on the temperature detected by the cooling water temperature sensor 4 or the oil temperature sensor 5. In this case, the correlation between the temperature of the liquid crystal element 45 and the temperature of the cooling water and/or engine oil may be obtained in advance by experiments etc., and the temperature of the liquid crystal element 45 may be estimated based on the experiment data.

If the temperature is not low (STEP S11; NO), the determination in STEP S11 is repeated at regular intervals. Therefore, even when the temperature of the lamp unit 34 drops for some reason after some time after starting the vehicle power unit, it is possible to start the heating operation of the liquid crystal element 45 at that point. In this case, it is preferable to initiate this operation when the vehicle is at a stop.

If the temperature is low (STEP S11; YES), the liquid crystal control part 12 instructed by the heating control part 11 of the control part 1 provides a signal to the liquid crystal drive part 32 in order to set the liquid crystal element 45 to a light-shielded state (STEP S12). Here, since the liquid crystal element 45 of the present embodiment is a normally black type, a control signal is provided to the liquid crystal drive part 32 so as to maintain the no voltage applied state.

Here, in the case where the liquid crystal element 45 is a normally white type, since the liquid crystal element 45 needs to be in a light-shielded state, a control signal is transmitted to perform such driving from the liquid crystal control part 12 of the control part 1 to the liquid crystal drive part 32.

Next, the light source control part 13 instructed by the heating control part 11 of the control part 1 transmits a control signal to the LED drive part 31 of the respective headlights 6L and 6R, thereby setting each light source 40 to a light-on state (STEP S13). Here, a drive current greater than the rated current value may be applied to the LED of each light source 40, for example. Since it is a very short time to light the LED in such a condition and since the environmental temperature is extremely low, no damage is done to the LED.

At this time, since the plurality of liquid crystal elements 45 is set to the light-shielded state, light hardly leaks from the respective headlights 6L and 6R to the outside. And the responsiveness of the plurality of liquid crystal elements 45 can be enhanced by heating the plurality of liquid crystal elements 45 using the light emitted from each light source 40 to raise its temperature. For example, when light from the light source 40 is absorbed by the pair of polarizers 43 and 44 and the temperature of each of the polarizer 43 and 44 rises, heat is transmitted to the liquid crystal panel 42 and the temperature of the liquid crystal panel 42 also rises. Thereby, heating of the panel can be performed.

The heating control part 11 of the control part 1 determines whether or not a predetermined time has elapsed since each light source 40 was set to a light-on state (STEP S14). Here, the predetermined time may be set to a constant value, or the predetermined time may be set in accordance with the level of temperature detected by the plurality of headlight temperature sensors 33 where the predetermined time becomes longer as the temperature becomes lower.

The predetermined time is preferably set, for example, as the time required for the temperature of the liquid crystal element 45 to be higher than −20° C., and can be set for several tens of seconds to one minute. This is because the response time for briefly switching on high-beam is generally about 200 ms when −20° C. or higher although this depends on the conditions of the liquid crystal element 45 and the driving voltage, and it becomes possible to sufficiently cope with the light distribution control of high-beam flashing, etc.

If the predetermined time has not elapsed (STEP S14; NO), the heating control part 11 of the control part 1 determines whether or not the temperature of the liquid crystal element 45 has become equal to or higher than the predetermined temperature (STEP S15). If the temperature is not equal to or higher than the predetermined temperature (STEP S15; NO), the process returns to step S14. By carrying out this process, the lighting of the light source 40 is stopped in the event that the liquid crystal element 45 is sufficiently heated even when the predetermined time has not elapsed, thereby allowing to prevent the temperature of the liquid crystal element 45 from rising more than necessary.

If the predetermined time has elapsed (STEP S14; YES), or if the temperature of the liquid crystal element 45 has become equal to or higher than the predetermined temperature (STEP S15; YES), then the light source control part 13 receiving the instruction from the heating control part 11 of the control part 1 transmits a control signal to the LED drive parts 31 of the respective headlights 6L and 6R, thereby setting each light source 40 to a light-off state (STEP S16). Here, when the light switch 3 is operated and irradiation of high beam is instructed, the light source control part 13 of the control part 1 cancels the light-off state and sets each light source 40 to a light-on state at a rated current value or less of the LED. Thereafter, the process returns to STEP S11.

According to the embodiment as described above, in a vehicular lamp system using a liquid crystal element, in a cryogenic environment, since the liquid crystal element 45 is rapidly heated to improve the responsiveness by using light from the light source 40, it is possible to reliably perform light irradiation even in such cryogenic environment.

It should be noted that this invention is not limited to the subject matter of the foregoing embodiments, and can be implemented by being variously modified within the scope of the present invention as defined by the appended claims. For example, in the above-described embodiment, when the light source 40 is set to lighting-on state in order to heat the liquid crystal element 45, the light-on state of the light source 40 is halted either when the predetermined time has elapsed or when the liquid crystal element 45 temperature has become equal to or higher than the predetermined value, but only one of the determinations may be applied. That is, the light-on/light-off of the light source 40 may be determined based on the temperature without determining the elapsed time, and conversely, the light-on/light-off of the light source 40 may be determined based on the elapsed time without determining the temperature.

Figure 5:
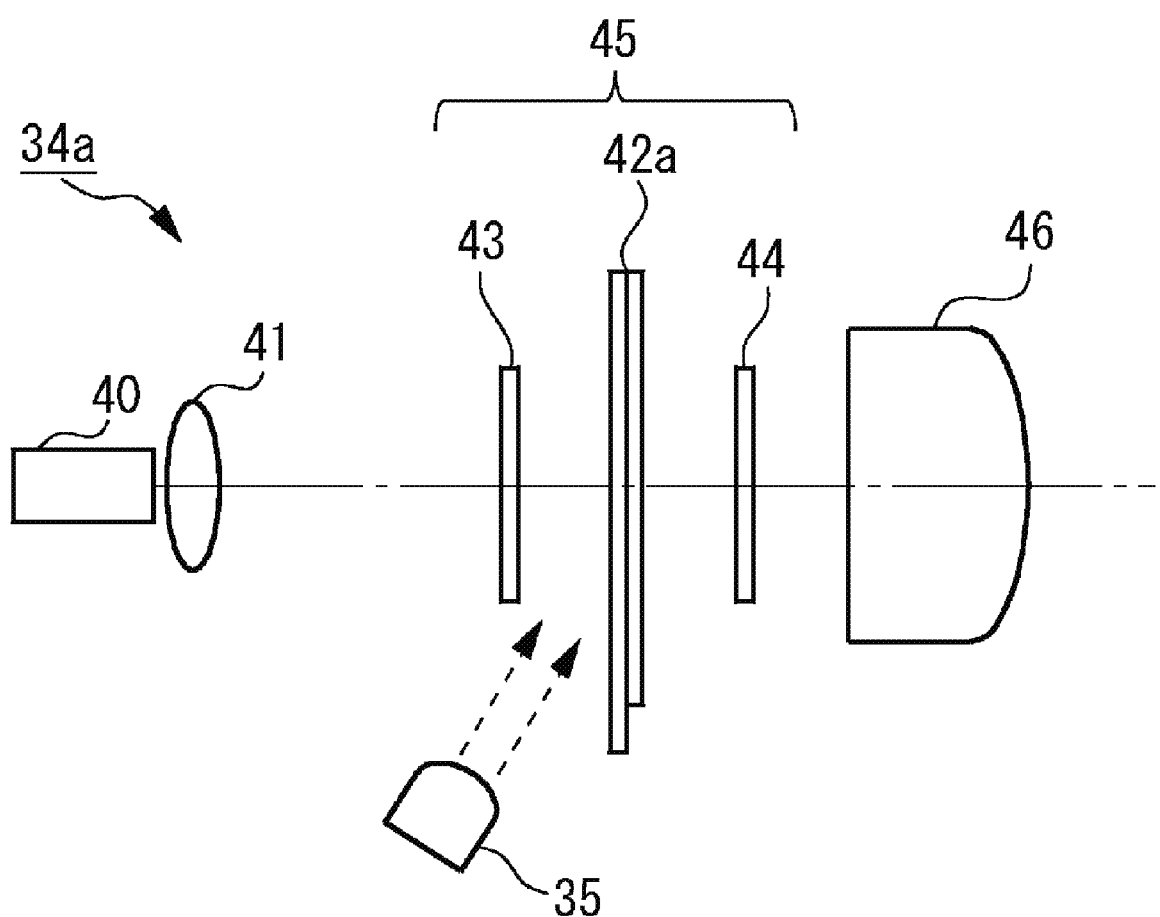
FIG. 5 is a diagram showing a modified configuration example of the lamp unit.

Further, it is also preferable to increase the heating efficiency of the liquid crystal element by adding nanoparticles to the liquid crystal element. A configuration example of the lamp unit 34a in such a case is shown in FIG. 5. For example, metal particles (for example, gold particles) of nanometer size are added as a near infrared ray absorbing material to the liquid crystal layer of the liquid crystal panel 42a of the liquid crystal element 45. Alternatively, metal particles of nanometer size may be added to the film on the substrate such as the alignment film of the liquid crystal panel 42a or other protective film. Then, when heating is performed by the light source 40 as described above, a light source 35 also irradiates near infrared rays to the liquid crystal panel 42a. As illustrated, it is preferable that the near infrared rays (for example, a wavelength of about 3 am or less) from the light source 35 directly irradiates the liquid crystal panel 42a without passing through the pair of polarizers 43 and 44. In this configuration, the near infrared rays are absorbed by the metal particles in the liquid crystal panel 42a, thereby enabling the temperature of the liquid crystal panel 42a to rise more efficiently. Here, when near infrared rays are sufficiently emitted along with visible light from the light source 40, the light source 35 may be omitted.

When adopting the configuration of FIG. 5, it is preferable that each of the projection lens 46, the polarizer 44 located on the projection lens 46 side, and the casing (outer lens etc.) of the lamp unit 34a (not shown in the figure) has an infrared absorbing function. Thus, it allows to prevent an unintended heating of the liquid crystal panel 42a due to infrared rays such as sunlight incident from the outside.

What is claimed is:

1. A vehicle headlight system configured to include a light source and a liquid crystal element comprising:

a headlight including a lamp unit having the liquid crystal element and irradiating a high beam, a temperature sensor and a liquid crystal drive part;

a control part including a liquid crystal control part, a light source operation control part, and a light distribution setting part which is adapted to set a light distribution pattern when selective light irradiation is performed within a high beam irradiation range;

an imaging unit that captures the space in front of a vehicle to generate an image; wherein the temperature sensor is installed within the housing of the headlight and detects the temperature in the vicinity of the lamp unit;

wherein the lamp unit includes the light source, a projection lens that projects the light emitted from the light source to the front of the vehicle, and the liquid crystal element disposed between the light source and the projection lens;

wherein the liquid crystal element includes a liquid crystal panel in which a plurality of pixel regions are formed by a patterned transparent conductive film and including a pair of substrates and a liquid crystal layer disposed between the pair of substrates;

a pair of polarizers disposed facing each other with a liquid crystal panel arranged therebetween with a gap, wherein the liquid crystal element is configured to be driven by the liquid crystal drive part, and the light emitted from the light source is incident to modulate the incident light to form images corresponding to various light distribution patterns;

wherein the liquid crystal control part controls the operation of the liquid crystal element according to the light distribution pattern set by the light distribution setting part based on a signal from the imaging unit;

wherein the control part is configured to determine whether or not the liquid crystal panel is estimated to be lower than a predetermined reference temperature based on a signal of the temperature sensor after starting the vehicle, and when it is determined that a temperature of the liquid crystal panel is lower than the predetermined reference temperature, the liquid crystal control part controls all of the plurality of pixel regions of the liquid crystal element to a light-shielded state and the light source operation control part controls the light source to a light-on state and heats the liquid crystal element; and when it is determined that the temperature of the liquid crystal panel is not lower than the predetermined reference temperature, the determination of whether or not the temperature of the liquid crystal panel is estimated to be lower than the predetermined reference temperature is repeated at predetermined intervals.

2. The vehicle headlight system according to claim 1, wherein the liquid crystal element is disposed so that absorption axes of the pair of polarizers are orthogonal to each other.

3. The vehicle headlight system according to claim 2, wherein the liquid crystal panel is a vertical alignment type liquid crystal panel.

4. The vehicle headlight system according to claim 3, wherein in the control part, when it is determined that a temperature of the liquid crystal panel is lower than the predetermined reference temperature after the vehicle is started, the liquid crystal control part controls the liquid crystal element so as to maintain a no voltage applied state, and the light source operation control part controls the light source to a light-on state and heats the liquid crystal element.

5. The vehicle headlight system according to claim 2, wherein the light source is an LED; and wherein the light source operation control part is configured to heat the LED by applying a drive current greater than a rated current value of the LED when it is determined that a temperature of the liquid crystal panel is lower than the predetermined reference temperature.

6. The vehicle headlight system according to claim 5, wherein in the control part is configured to control the light-on state of the LED to stop the heating when it is determined that a temperature of the liquid crystal panel is lower than the predetermined reference temperature and the light source operation control part controls the light source to a light-on state to heat the liquid crystal element for a predetermined time or when the controlled temperature exceeds the reference temperature value.

7. The vehicle headlight system according to claim 1, wherein nanoparticles are added to the liquid crystal element.

8. The vehicle headlight system according to claim 7 further comprising:
   a near infrared rays light source,
   wherein the heating is performed by the light emitted from the light source and the near infrared rays light source.

9. The vehicle headlight system according to claim 8, wherein, in the liquid crystal element, the pair of polarizers are arranged facing each other with the liquid crystal panel disposed therebetween;
   wherein a predetermined gap is provided between the pair of polarizers and the liquid crystal panel;
   wherein near infrared rays from the near infrared rays light source are directly applied to the liquid crystal panel without passing through the pair of polarizers.

10. The vehicle headlight system according to claim 7, wherein the control part is configured to start the heating while the vehicle is at a stop when the temperature of the liquid crystal element is estimated to be lower than the predetermined reference temperature after the vehicle is started.

11. The vehicle headlight system according to claim 1, wherein the control part is configured to start the heating while the vehicle is at a stop when the temperature of the liquid crystal element is estimated to be lower than the predetermined reference temperature after the vehicle is started.

* * * * *